United States Patent [19]
Toyoda

[11] Patent Number: 5,592,882
[45] Date of Patent: Jan. 14, 1997

[54] PRINTING PRESS BEARING AND METHOD OF CONTROLLING TEMPERATURE OF BEARINGS OF A PRINTING PRESS

[75] Inventor: Hideaki Toyoda, Sekiyadomachi, Japan

[73] Assignee: Komori Corporation, Tokyo, Japan

[21] Appl. No.: 570,818

[22] Filed: Dec. 12, 1995

Related U.S. Application Data

[63] Continuation of Ser. No. 386,219, Feb. 9, 1995, abandoned, which is a continuation of Ser. No. 61,594, May 13, 1993, abandoned.

[30] Foreign Application Priority Data

Jun. 4, 1992 [JP] Japan .................. 4-037775 U

[51] Int. Cl.⁶ .................................................. B41F 23/04
[52] U.S. Cl. .................. 101/487; 101/153; 101/216; 101/152; 101/349
[58] Field of Search ............... 101/152, 153, 101/178, 179, 216, 219, 228, 349, 350, 424.1, 487; 165/30, 36, 89; 384/476, 493, 557, 900

[56] References Cited

U.S. PATENT DOCUMENTS

| | | | |
|---|---|---|---|
| 2,352,206 | 6/1944 | Kendall | 384/900 |
| 2,452,046 | 10/1948 | Garrison et al. | 384/900 |
| 2,504,284 | 4/1950 | Voigt | 384/900 |
| 2,971,460 | 2/1961 | Shindle | 101/487 |
| 4,459,726 | 7/1984 | O'Brien et al. | 165/89 |
| 4,948,269 | 8/1990 | Hamilton | 384/476 |
| 5,048,418 | 9/1991 | Hars et al. | 101/178 |
| 5,058,496 | 10/1991 | Wittkopf | 100/35 |
| 5,074,213 | 12/1991 | Kurosawa | 101/487 |
| 5,189,960 | 3/1993 | Valentini et al. | 101/349 |

FOREIGN PATENT DOCUMENTS

| | | |
|---|---|---|
| A-0150047 | 7/1985 | European Pat. Off. |
| 35445272C1 | 2/1987 | Germany . |
| 8813088 | 12/1988 | Germany . |
| 3730153 | 3/1989 | Germany . |
| 4036121A1 | 1/1992 | Germany . |

*Primary Examiner*—Edgar S. Burr
*Assistant Examiner*—Daniel J. Colilla
*Attorney, Agent, or Firm*—Abelman, Frayne & Schwab

[57] ABSTRACT

In a printing press, a bearing for supporting a cylinder axle of a printing cylinder is supported by a bearing housing attached to a frame of the printing press. A heating device circulates heated water through a path formed in the cylinder. A path is formed in at least one of the bearing housing and the frame, and heated water is supplied to that path in order to shorten the warming up period for printing.

3 Claims, 5 Drawing Sheets

PRINTING PRESS BEARING AND METHOD OF CONTROLLING TEMPERATURE OF BEARINGS OF A PRINTING PRESS

This application is a Continuation under 37 C.F.R. 1.62 of prior application Ser. No. 08/386,219 filed on Feb. 9, 1995 now abandoned which is a Continuation under 37 C.F.R. 1.62 of prior application Ser. No. 08/061,594 now abandoned filed on May 13, 1993.

BACKGROUND OF THE INVENTION

1. Field of the Invention

The present invention relates to controlling the temperature of bearings of a cylinder of a printing press and a method for controlling a temperature of the bearings of the cylinder.

2. Description of the Related Art

In an intaglio rotary printing press, ink is supplied to an intaglio plate cylinder by an inking device. Redundant ink except that on the intaglio surface is wiped off by a wiping roller. The remaining ink on the intaglio surface is transferred onto paper which is passed between the intaglio plate cylinder and an impression cylinder in order to print onto the paper.

Ink commonly used for such an intaglio printing press has relatively high viscosity. If the temperature of the intaglio surface of an intaglio plate cylinder is too low, ink is not transferred satisfactorily to the intaglio surface, and ink is not dispersed into narrow grooves of the intaglio surface. For this reason, the intaglio plate cylinder has to be heated to between 60° C. and 90° C.

To heat the intaglio plate cylinder, commonly a path for heated water is provided near the inner surface of the intaglio plate cylinder. The heated water is circulated in a zigzag path by means of a rotary joint provided at the plate cylinder axle which is connected to a water heating unit.

Heated water passed through the plate cylinder axle results in the bearing for the axle becoming thermally expanded. On the other hand, in such a printing press, the bearing gap must be as small as is possible (minus tolerance) in order to maintain printing quality and also to prevent the bearings from fretting.

While a bearing housing mounted on the frame of the printing press machine and also the frame remain cool, the plate cylinder axle is thermally expanded. This results in an overload applied to the bearings, and the bearings become damaged.

When the temperature of the printing cylinder and its axle are raised, the bearing gap is reduced and becomes minus tolerance, the resulting overload on the bearings dictates that a printing operation cannot be started at that time, since the bearing gap is in an improper range at that time. Although the temperature of the surface of the plate cylinder may be stable, it is an improper condition while a temperature differential exists between an outer peripheral surface of the bearing and an inner peripheral surface of the bearing. A printing operation cannot be commenced until the temperature differential is reduced to a predetermined level.

In an intaglio printing press, large printing presses are required, this requiring that the bearings and the bearing housings be large in size. A longer time period (for example, more than eight hours) is needed to raise the temperature of the bearings to a stable temperature.

Such a problem exists not only in an intaglio printing press, but also in other types of printing presses that require heating a plate cylinder.

SUMMARY OF THE INVENTION

An object of the present invention is to provide a means for preventing a bearing of a cylinder axle of a printing press from overloading when a plate cylinder of the press is heated.

Another object of the present invention is to shorten a warm up period required in such a printing press.

According to the present invention, a printing press includes a bearing for supporting a cylinder axle of a plate cylinder, a bearing housing supported by a frame of the printing press, a heating device for heating the cylinder and a thermally controlled device for heating at least one of the bearing housing and the frame.

A method for thermally controlling a printing press according to the present invention, comprises the steps of heating a plate cylinder of the printing press, heating at least one of a bearing housing for supporting a plate cylinder axis and a frame of the printing press machine for holding the bearing house, and interrupting heating of the bearing housing or the frame when the frame is heated up to the predetermined temperature.

According to the present invention, although a cylinder is thermally expanded by heating the cylinder, overload applied to the bearing is avoided by controlled heating of the bearing housing or of the frame.

According to the present invention, a temperature of the bearing becomes stable in a relatively short time, so that a warming up period for starting a printing operation can be shortened to a remarkable extent.

According to the present invention, the bearing housing is thermally controlled, this resulting in significant energy savings.

Further, according to the present invention, overload on the bearings during the warming-up operation is prevented, this allowing the bearing gap to be designed in a proper range. Thus, high quality printing is obtained and friction and noise can be reduced.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

One embodiment of a printing press according to the present invention will now described.

Figure 1:
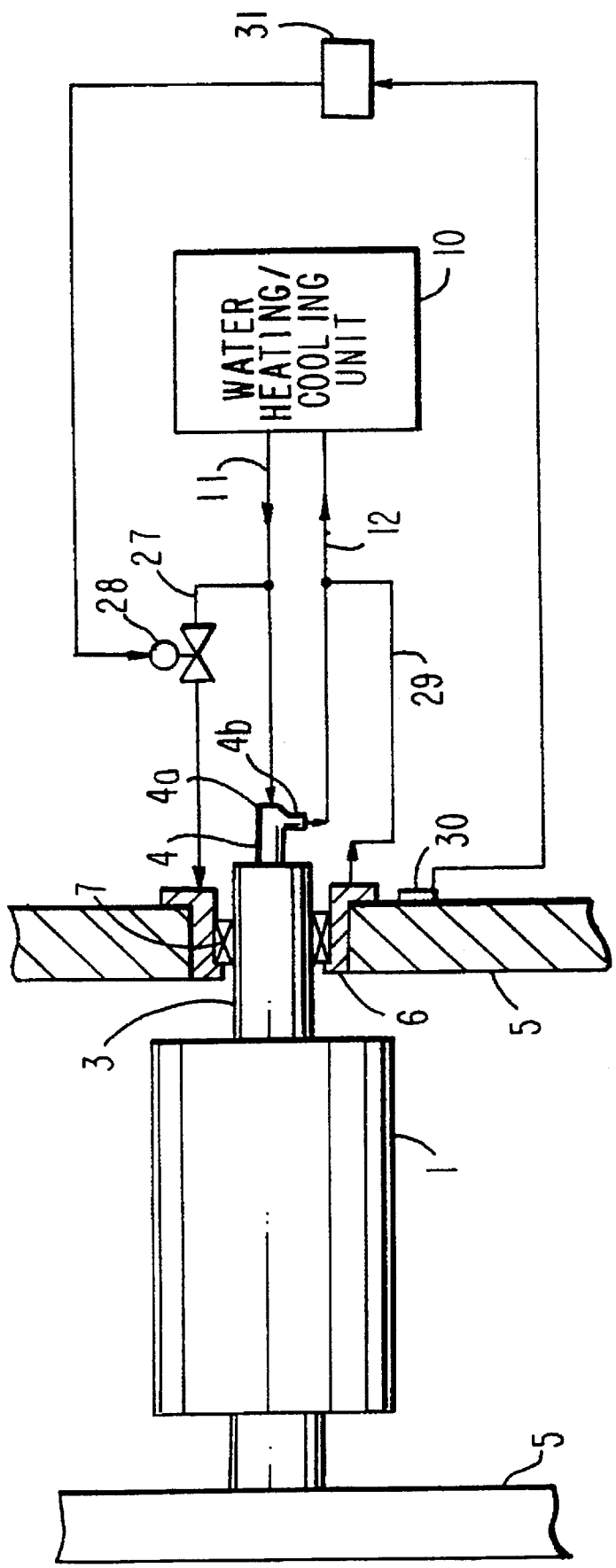
FIG. 1 is a block diagram of an intaglio printing press according to the present invention.
Figure 2:
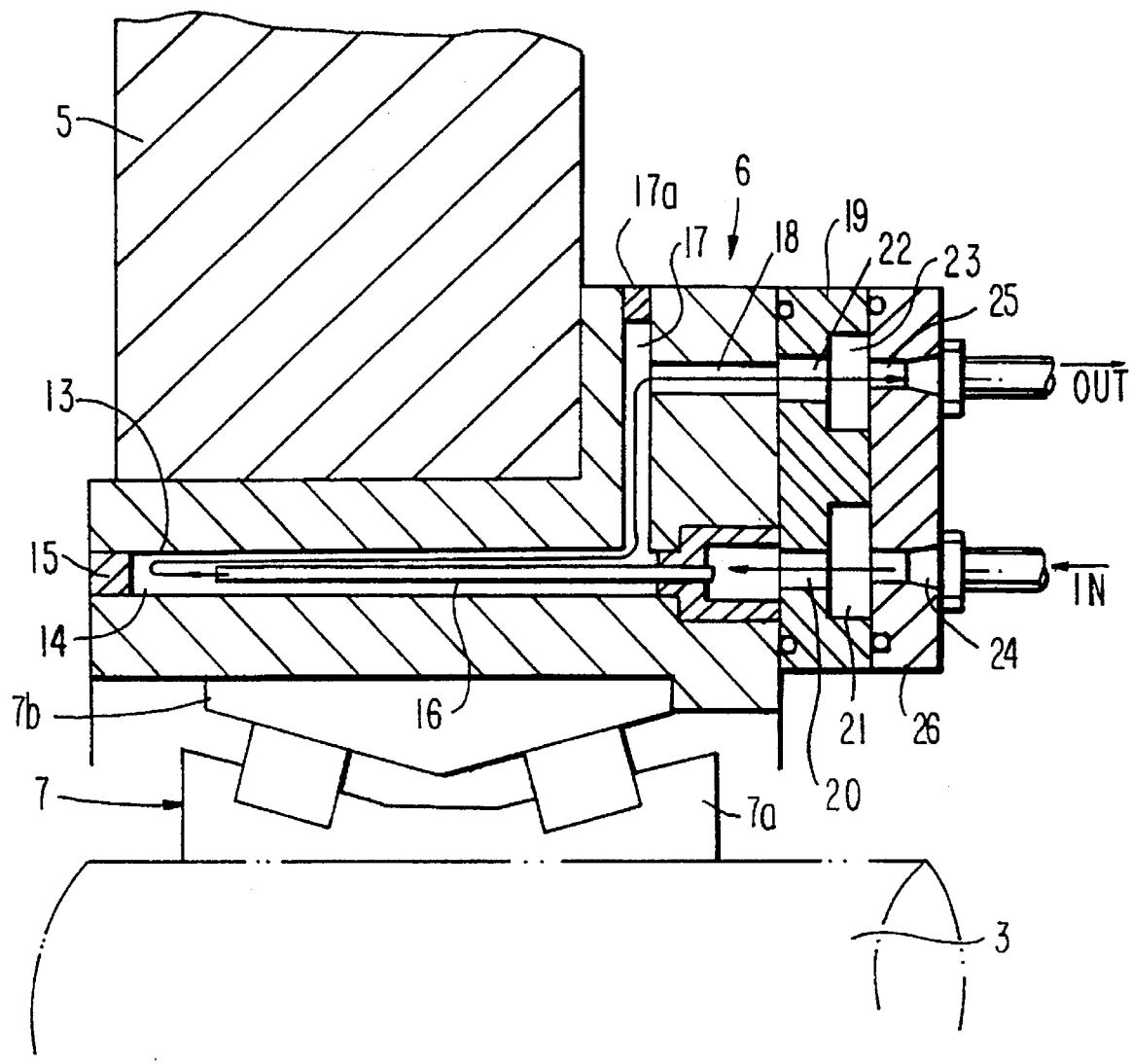
FIG. 2 is a cross sectional view of a bearing portion of the intaglio printing press according to the present invention.

As shown in FIGS. 1 and 2, a plate cylinder axle 3 is integrally formed with an intaglio plate cylinder 1, and is rotatably supported in a bearing housing mounted on a frame 5 of the printing press, by means of a roller bearing 7.

Figure 4:
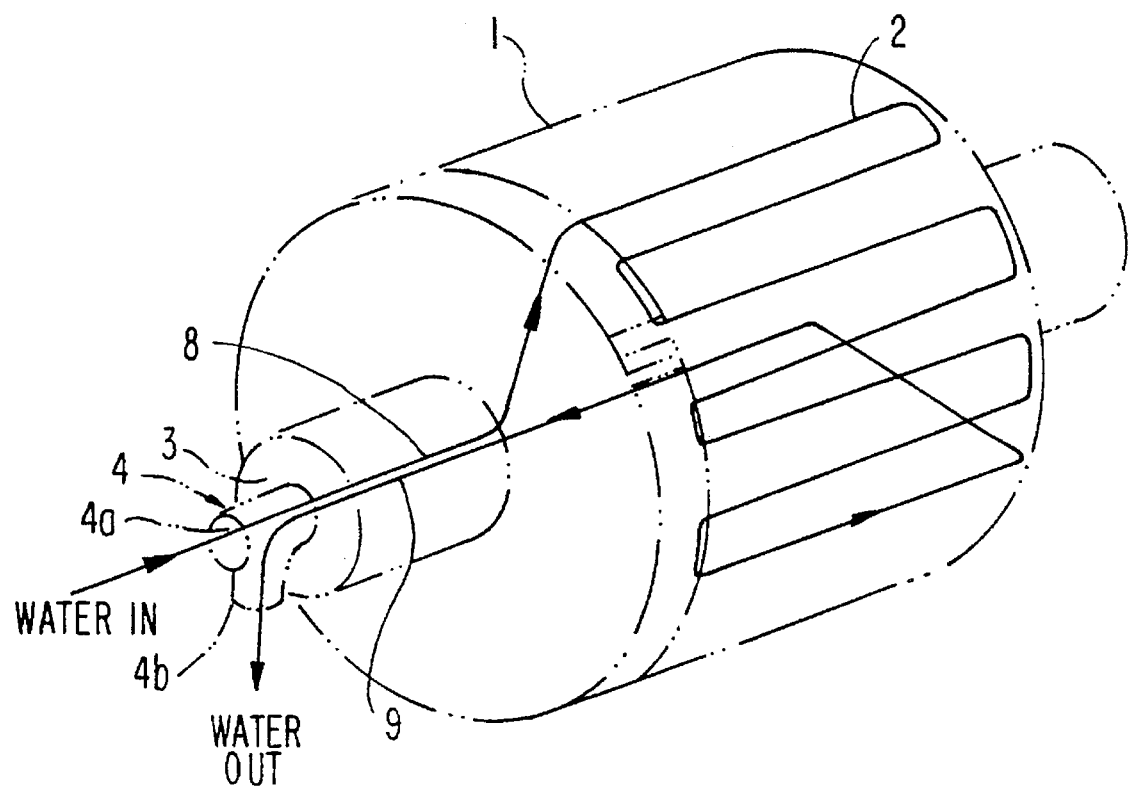
FIG. 4 is a diagrammatic perspective view showing a water path inside of the intaglio plate cylinder.

As shown in FIG. 4, water path 2 is provided near an inner peripheral surface of the intaglio plate cylinder 1. An inlet path 8 and an outlet path 9 of the water path 2 are formed in the plate cylinder axle 3, and are extended to an inlet portion 4a, and an outlet portion 4b, of a rotary joint 4, respectively. A water heating or cooling unit 10 is connected to the inlet portion 4a and to the outlet portion 4b through pipes 11 and 12.

Water heated by the water heating or cooling unit 10 is supplied by the pipe 11 to the water path 2 in the intaglio plate cylinder 1 through the rotary joint 4 by means of the inlet path 8 in the plate cylinder axle 3 and is returned through the rotary joint 4 and the pipe 12.

A water path 13 also is provided in the bearing 6 to pass heated water therethrough. The water path 13 is provided by a plurality of bores 14 (for example, six to eight bores) arranged circumferentially of the bearing housing 6. Each bore 14 extends in an axial direction of the bearing 6. One end of each bore 14 is closed by a plug 15. A supply pipe 16 is inserted into the bore 14 from the opposite end thereof. Further, the bore 14 is connected to a radial bore 17 and an outlet bore 18. The bore 17 extends radially of the bearing housing 6, and the outlet bore 18 is connected to the bore 17 and extends in the axial direction of the bearing housing 6. The outer end of each of the bores 17 is stopped by a plug 17a.

A ring-shaped connecting member 19 is secured to an end surface of the bearing housing 6. The connecting member 19 includes a ring-shaped supply groove 21 having connecting holes 20 for connection to each of the supply pipes 16, and a ring-shaped return groove 23 having connecting holes 22 for connection to each of the outlet bores 18.

At the opposite end surface of the connecting member 19, a cap member 26 is provided. The cap member 26 has a supply groove 21 and a return groove 23.

A bypass pipe 27 is connected to the supply pipe 11, and is connected to a supply opening 24 formed in the cap member 26.

An electro-magnetic valve 28 is positioned in the bypass pipe 27 for closing and opening the bypass pipe 27.

A bypass pipe 29 is connected to the returning pipe 12, and is connected to a return opening 25 formed in the cap member 26.

Accordingly, a heating medium circulation system is provided in the bearing housing 6, similar to that provided in the intaglio plate cylinder 1.

A thermal sensor 30 is provided on the frame 5 near the bearing housing 6. A signal detected from the thermal sensor 30 is input to a thermo-controlling device 31. Thus, the electro-magnetic valve 28 is controlled, for closing and opening the bypass pipe 27, by the thermo-controlling device 31.

The manner of controlling the temperature of the bearing housing 6 will now be described.

When the press is operated, heated water as a heating medium is supplied from the thermo-control unit 10 through the pipe 11, the rotary joint 4, and the plate cylinder axle 3, and is returned to the thermo-control unit 10 through the plate cylinder axle 3, the rotary joint 4, and the pipe 12, in order to heat the surface of the intaglio plate cylinder 1 to a predetermined temperature (for example, 90° C.).

Heated water also is circulated through the water path 13 in the bearing housing 6 through the bypass pipe 27, the cap member 26, and the connecting member 19, and, is returned through the connecting member 19, the cap member 26, and the bypass path 29. The valve 28 opens the bypass path 27 when the temperature of the frame 5, which is detected by the thermal sensor 30, is under the temperature predetermined by the thermo-controlling device 31. The temperature set by the thermo-controlling device 31 is a temperature of the frame 5 required in order for the press to print stably. For example, when the temperature of a surface of the intaglio plate cylinder 1 is set at 90° C., the temperature at the frame 5 is set to 50° C. when the room temperature 25° C.

The plate cylinder axle 3 is thermally expanded by flowing heated water through the cylinder plate axle 3. The bearing housing 6 also is thermally expanded by flowing heated water through the bearing housing 6, and thus, an overload applied to the bearing 7 can be prevented.

When the temperature at the frame 5 is heated up above the predetermined temperature, valve 28 closes and water supplied to the bearing housing 6 is stopped. When the temperature at the frame 5 drops below the predetermined temperature, the valve 28 is opened so that heated water is circulated again. Thus, the temperature at the frame 5 is thermally controlled to maintain the predetermined temperature range.

Figure 3:
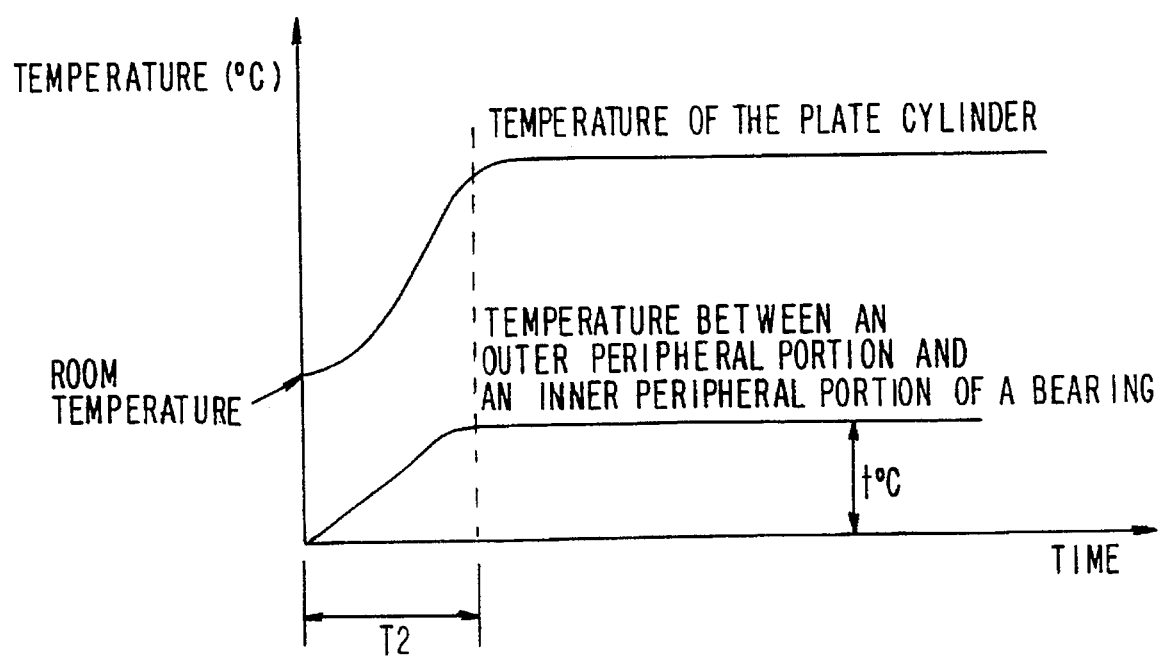
FIG. 3 shows a relation between the time period and the temperature of the plate cylinder, and the temperature difference between an outer peripheral portion and an inner peripheral portion of the bearing according to the present invention.

As shown in FIG. 3, a dangerous condition is overcome,, in which a temperature difference between an outermost peripheral surface and an innermost peripheral surface of the bearing 7 is relatively large, by heating up the bearing housing 6.

In FIGS. 3, the vertical axis shows temperatures of a cylinder plate, and a temperature difference between the innermost surface and the outermost surface of a bearing. The horizontal axis shows a time period after heating up the cylinder plate. An upper line is the temperature difference between the outer peripheral portion and the inner peripheral portion of the bearing 7.

In the case of a printing press as shown in FIG. 3, the temperature difference rapidly increases, and then the temperature difference becomes stable. A time period when the temperature difference is relatively large is the above described dangerous condition, as shown in inclined lines in FIG. 3. The time period T2 is a warming up period required to reach the stable temperature difference.

Figure 5:
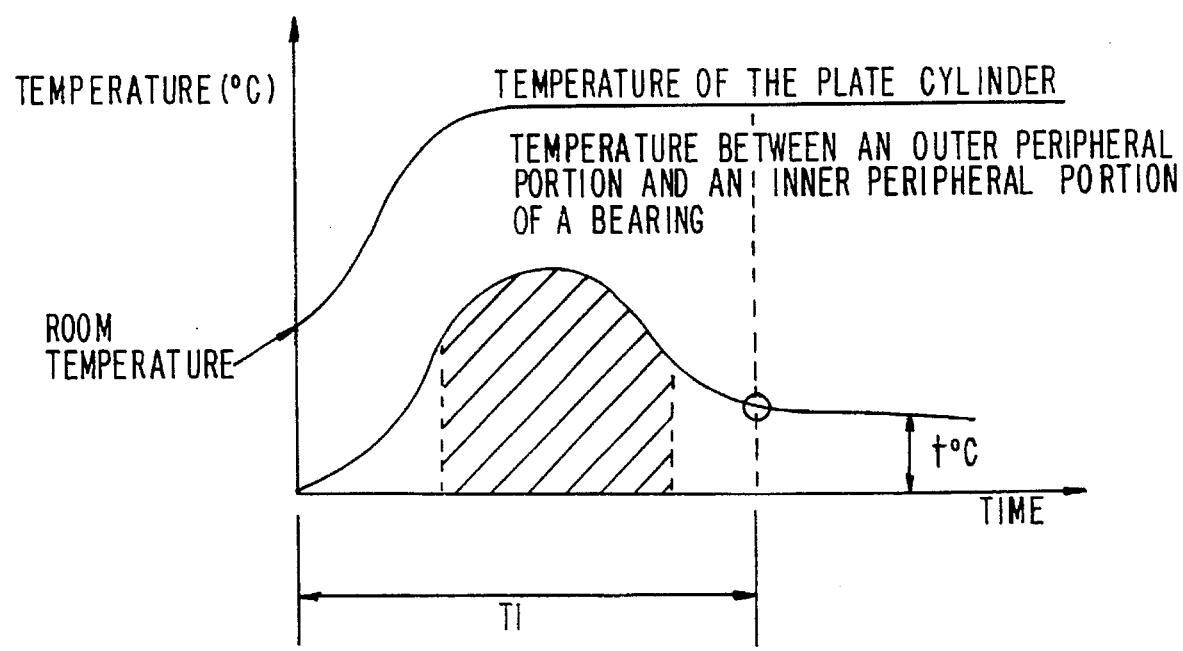
FIG. 5 shows a relation between the time period and the temperature of the plate cylinder, and the temperature difference between an outer peripheral portion and an inner peripheral portion of a bearing of a conventional printing press machine.

On the other hand, in a case of a prior art printing press as shown in FIG. 5, the temperature difference is not rapidly stabilized.

The time period T1 and T2 is the time required for warming up the press beginning from start. The period T1 is longer by 5 to 6 hours than the time period T2. When comparing the present 5 to 6 hours than the time period T2. When comparing the present invention and the conventional art, the time period required for stabilization of the temperature difference can be remarkably shortened by the present invention.

When a plate is to be changed, relatively cool water is supplied to the intaglio plate cylinder 1 from the thermo-controlling unit 10, in order to make the change of the plate more easy. In this case, even if valve 28 closes the bypass path 27, the bearing housing 6 and the frame 5 are maintained at a heated condition, and thus, a warming up period can be shortened.

In the above embodiment, although the unit 10 is used both for heating up the bearing housing 6 and for heating up the cylinder plate 1, separate units can be provided for the bearing housing 6 and the plate cylinder 1, respectively. However, the embodiment in which the heating unit is commonly used is preferred, since the embodiment an be provided more economically. In the above embodiment, although a thermo-controlling unit 10 for supplying a heat fluid medium is used, other devices can be employed.

In the difference embodiment according to the present invention, heated water is circulated in the frame 5 and a temperature of the water is thermally controlled. The heating means 10 may be commonly used as a means for the heating water in the frame 5 and the means for heating the water in an intaglio plate cylinder plate. Alternatively, two separate heating means can be provided.

The above embodiment of a printing press according to the present invention is utilized for an intaglio printing press. It can also be utilized for an offset printing press, or other type printing press.

I claim:

1. A printing press comprising:

a cylinder having a cylinder axle, a bearing for supporting said cylinder axle, a bearing housing for supporting said bearing, a frame for supporting said bearing housing, a first heating means for heating up a surface of said cylinder to a first temperature after starting said printing press and before starting any printing operation by supplying heating medium to an inner side of said surface of said cylinder through said cylinder axle, a second heating means for heating up at least one of said bearing housing and said frame to a second temperature after starting said printing press and before starting any printing operation by supplying heating medium to at least one of said bearing housing and said frame, and a heating/cooling unit for supplying heating medium to said inner side of said surface of said cylinder and at least one of said bearing housing and said frame and for supplying cooling medium to said inner side of said surface of said cylinder and not supplying cooling medium to said bearing housing and said frame while a printing plate is exchanged, wherein said second temperature is a stable temperature reached by said bearing housing and said frame during a printing operation, as measured in the absence of heat supplied to at least one of said bearing housing and said frame, said second temperature being dependent on said first temperature and the ambient temperature in the location of said printing press, said second temperature being determined such that overloads applied to said bearing are prevented and the warm up period required after starting said printing press and before starting any printing operation is reduced from the warm up period required in the absence of said second heating means.

2. A printing press comprising:

a cylinder having a cylinder axle, a bearing for supporting said cylinder axle, a bearing housing for supporting said bearing, a frame for supporting said bearing housing, a heating/cooling unit for supplying heating medium and cooling medium, and a heating means for heating up at least one of said bearing housing and said frame to a temperature after starting said printing press and prior to starting any printing operation, wherein said temperature is thermally stable with respect to another temperature of a surface of said cylinder for a printing operation, said temperature being dependent on said another temperature and the ambient temperature in the location of said printing press, said temperature being determined such that overloads applied to said bearing are prevented and the warm up period required after starting said printing press and before starting any printing operation is reduced from the warm up period required if neither said bearing housing nor said frame was heated up to said temperature by said heating means, and said heating means heats up said surface of said cylinder to said another temperature after starting said printing press and before starting any printing operation by supplying heating medium to an inner side of said surface of said cylinder through said cylinder axle, said heating/cooling unit supplying said heating medium to said inner side of said surface of said cylinder and at least one of said bearing housing and said frame and supplying said cooling medium to said inner side of said surface of said cylinder and not supplying said cooling medium to said bearing housing and said frame while a printing plate is exchanged.

3. A method for thermally controlling a printing press including a cylinder having a cylinder axle, a bearing for supporting said cylinder axle, a bearing housing for supporting said bearing, and a frame for supporting said bearing housing, said method comprising the following steps:

(a) heating up a surface of said cylinder to a temperature after starting said printing press and before starting any printing operation by supplying heating medium to an inner side of said surface of said cylinder through said cylinder axle, (b) heating up at least one of said bearing housing and said frame to another temperature after starting said printing press and before starting any printing operation, wherein said another temperature is thermally stable with respect to said temperature for printing, said another temperature being dependent on said temperature and the ambient temperature in the location of said printing press, said another temperature being determined such that overloads applied to said bearing are prevented and the warm up period required after starting said printing press and before any printing operation is reduced from the warm up period required if neither said bearing housing nor said frame was heated up to said another temperature, (c) interrupting the step (b) when at least one of said bearing housing and said frame is heated up to said another temperature, and (d) cooling down said surface of said cylinder by supplying cooling medium to said inner side of said surface of said cylinder through said cylinder axle and not cooling down said bearing housing and said frame while a printing plate is exchanged.

\* \* \* \* \*